United States Patent
Flammer et al.

(10) Patent No.: US 7,894,698 B2
(45) Date of Patent: *Feb. 22, 2011

(54) OPTICAL FIBER

(75) Inventors: Ivo Flammer, Paris (FR); Louis-Anne De Montmorillon, Versailles (FR); Pieter Matthijsse, Hapert (NL)

(73) Assignee: Draka Comteq B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/493,520

(22) Filed: Jun. 29, 2009

(65) Prior Publication Data
US 2009/0263092 A1 Oct. 22, 2009

Related U.S. Application Data

(62) Division of application No. 11/999,333, filed on Dec. 4, 2007, now Pat. No. 7,555,186.

(30) Foreign Application Priority Data
Dec. 4, 2006 (EP) .................. 06291866

(51) Int. Cl.
*G02B 6/036* (2006.01)
(52) U.S. Cl. ..................................... 385/127
(58) Field of Classification Search .............. None
See application file for complete search history.

(56) References Cited

U.S. PATENT DOCUMENTS

| | | |
|---|---|---|
| 4,750,806 A | 6/1988 | Biswas |
| 4,838,643 A | 6/1989 | Hodges et al. |
| 4,852,968 A | 8/1989 | Reed |
| 5,851,259 A | 12/1998 | Clayton et al. |
| 6,542,683 B1 | 4/2003 | Evans et al. |
| 6,587,623 B1 | 7/2003 | Papen et al. |
| 6,687,440 B2 | 2/2004 | Balestra et al. |
| 6,771,865 B2 | 8/2004 | Blaszyk et al. |
| 6,904,218 B2 | 6/2005 | Sun et al. |

(Continued)

FOREIGN PATENT DOCUMENTS

EP 0839770 A1 5/1998

(Continued)

OTHER PUBLICATIONS

European Search Report and Written Opinion in counterpart European Application No. 06291866, completed on May 29, 2007.

(Continued)

*Primary Examiner*—Omar Rojas
(74) *Attorney, Agent, or Firm*—Summa, Additon & Ashe, P.A.

(57) ABSTRACT

An improved optical fiber achieves both reduced bending and microbending losses, as well as a much higher Brillouin threshold, as compared to standard transmission fibers. The optical fiber comprises a core including at least two dopants and having a refractive index difference $\Delta n_1$ with an outer optical cladding, a first inner cladding having a refractive index difference $\Delta n_2$ with the outer cladding, and a depressed, second inner cladding having a refractive index difference $\Delta n_3$ with the outer cladding of less than $-3 \times 10^{-3}$. The radial concentration of at least one of the core dopants varies continuously over the entire core region of the optical fiber.

47 Claims, 5 Drawing Sheets

U.S. PATENT DOCUMENTS

| | | | |
|---|---|---|---|
| 6,941,054 B2 | 9/2005 | Tirloni et al. | |
| 6,952,519 B2 | 10/2005 | Bickham et al. | |
| 6,959,137 B2 | 10/2005 | Kalish et al. | |
| 7,164,835 B2 | 1/2007 | Matsuo et al. | |
| 7,171,074 B2 | 1/2007 | DiGiovanni et al. | |
| 7,315,677 B1 | 1/2008 | Li et al. | |
| 7,356,234 B2 | 4/2008 | de Montmorillon et al. | |
| 7,440,665 B2 | 10/2008 | Hasegawa | |
| 7,555,186 B2* | 6/2009 | Flammer et al. | 385/127 |
| 7,587,111 B2 | 9/2009 | de Montmorillon et al. | |
| 7,623,747 B2 | 11/2009 | de Montmorillon | |
| 2002/0118935 A1 | 8/2002 | Balestra et al. | |
| 2003/0142938 A1 | 7/2003 | Koyano et al. | |
| 2003/0223717 A1 | 12/2003 | Blaszyk et al. | |
| 2004/0218882 A1 | 11/2004 | Bickham et al. | |
| 2006/0103919 A1 | 5/2006 | DiGiovanni et al. | |
| 2007/0127878 A1 | 6/2007 | de Montmorillon et al. | |
| 2007/0258686 A1 | 11/2007 | De Montmorillon et al. | |
| 2007/0280615 A1 | 12/2007 | de Montmorillon et al. | |
| 2008/0152288 A1 | 6/2008 | Flammer et al. | |
| 2009/0263092 A1 | 10/2009 | Flammer et al. | |

FOREIGN PATENT DOCUMENTS

| | | |
|---|---|---|
| EP | 1477831 A1 | 11/2004 |
| EP | 1674901 A1 | 6/2006 |
| EP | 1762867 A1 | 3/2007 |
| EP | 1930753 | 6/2008 |
| JP | 06-196778 | 7/1994 |
| JP | 09-048629 | 2/1997 |
| JP | 09-218319 | 8/1997 |
| JP | 09-311231 | 12/1997 |
| JP | 2006-133314 | 5/2006 |
| WO | 02/19576 A2 | 3/2002 |
| WO | 2004/027941 A1 | 4/2004 |
| WO | 2004/092794 A1 | 10/2004 |
| WO | 2006/090519 | 8/2006 |

OTHER PUBLICATIONS

Botineau, J. et al, "Effective Stimulated Brillouin Gain in Single Mode Optical Fibers," Electronics Letters, vol. 31, No. 23, (Nov. 9, 1995) [Cited in Specification].

Yoshizawa, N. et al., "Stimulated Brillouin Scattering Suppression by Means of Applying Strain Distribution to Fiber with Cabling," IEEE JLT, vol. 11, No. 10, pp. 1518-1522, (1993) [Cited in Specification].

Matsuo, S. et al., "Low-Bending-Loss and Low-Splice-Loss Single-Mode Fibers Employing a Trench Index Profile," IEICE Trans. Electron, vol. E88-C, No. 5, (May 2005) [Cited in Specification].

Matsuo et al., "Bend-Insensitive and Low Splice-Loss Optical Fiber for Indoor Wiring in FTTH", OFC'04 Proceedings, paper Th13 (2004) [Cited in Specification].

Sakabe et al., "Enhanced Bending Loss Insensitive Fiber and New Cables for CWDM Access Networks", 53rd IWCS Proceedings, pp. 112-118 (2004) [Cited in Specification].

Bandou et al., "Development of Premises Optical Wiring Components Using Hole-Assisted Fiber" 53rd IWCS Proceedings, pp. 119-122 (2004) [Cited in Specification].

Yokokawa et al., "Ultra-Low Loss and Bend Insensitive Pure-silica-core Fiber Complying with G.652 C/D and its Applications to a Loose Tube Cable", 53rd IWCS Proceedings, pp. 150-155 (2004) [Cited in Specification].

* cited by examiner

OPTICAL FIBER

CROSS-REFERENCE TO PRIORITY APPLICATIONS

This application is a continuation of commonly assigned U.S. application Ser. No. 11/999,333 for Optical Fiber, filed Dec. 4, 2007, (and published Jun. 26, 2008, as Publication No. 2008/0152288 A1), now U.S. Pat. No. 7,555,186, which claims the benefit of European Application No. 06291866.9 (filed Dec. 4, 2006, at the European Patent Office). The foregoing patent, patent application publication, and patent applications are hereby incorporated by reference in their entirety.

FIELD OF THE INVENTION

The invention relates to the field of optical fiber transmission and, more specifically, to an optical fiber having reduced losses due to stimulated Brillouin scattering (SBS) and reduced bending and microbending losses.

BACKGROUND OF THE INVENTION

A refractive index profile of an optical fiber is a graphical representation of the value of the refractive index as a function of optical fiber radius. Conventionally, the distance r to the center of the fiber is shown along the abscissa, and the difference between the refractive index and the refractive index of the fiber cladding is shown along the ordinate axis. The optical fiber refractive index profile is referred to as a "step" profile, a "trapezoidal" profile, a "parabolic" profile, or a "triangular" profile for graphs having the respective shapes of a step, a trapezoid, a parabola, or a triangle. These curves are generally representative of the theoretical or reference index profile (i.e., set profile) of the fiber. The fiber manufacturing constraints and stresses may lead to a slightly different profile.

An optical fiber typically includes an optical core, whose function is to transmit and possibly to amplify an optical signal, and an optical cladding, whose function is to confine the optical signal within the core. For this purpose, the refractive indexes of the core $n_c$ and the outer cladding $n_g$ are such that $n_c > n_g$. As is well known, the propagation of an optical signal in a single-mode optical fiber is divided into a fundamental mode (i.e., dominant mode) guided in the core and into secondary modes (i.e., cladding modes) guided over a certain distance in the core-cladding assembly.

Optical fibers are key components in modern telecommunication systems. Operators are constantly concerned about increasing the optical power transmitted along the fiber while limiting aging and losses of the optical fiber. For logistical reasons, operators are concerned about reducing the number of different kinds of fibers and are willing to use the same kind of fibers as feeder and termination fibers and as line fibers. Termination fibers need to have low bending sensitivity as they generally experience small bending radii in their installation. Feeder fibers need to have reduced Brillouin scattering as they distribute high input power into the telecommunication system.

One limitation for use of such optical fibers for telecommunication applications is loss due to stimulated Brillouin scattering (SBS). SBS is an optical nonlinearity due to interaction of optical photons with acoustic phonons of the glass matrix constituting the optical fiber. SBS limits the maximum optical power throughput of the optical fiber transmission system; as input power increases above what is known as the Brillouin threshold, the power that can be transmitted along the optical fiber reaches an upper limit. Any additional input power to the optical fiber scatters in the backward direction because of the interaction with acoustic phonons rather than propagating in the forward, launch direction as a higher power signal. Thus, SBS reduces the signal-to-noise ratio at the receiver and can cause the transmitter to become unstable as a result of the entry of reflected light. Moreover, the increasing use of optical amplifiers and solid state Nd:YAG lasers at ever increasing data rates over longer and longer distances all combine to exacerbate SBS.

Exemplary techniques suggested in the literature to increase the Brillouin threshold, minimize the detrimental effects of SBS, and increase the power handling capacity of the optical fiber rely on broadening either the photon energy spectrum of the source or the phonon energy spectrum of the glass to reduce the efficiency of the interaction. A broadening of the spontaneous Brillouin spectrum width will increase the Brillouin threshold. This can be achieved by making the Brillouin frequency shift to vary in the fiber section or along the fiber length.

European Patent No. 0839770 (and its counterpart U.S. Pat. No. 5,851,259) propose modulating drawing tension along the fiber to suppress SBS with no significant change in fiber loss or dispersion factors.

Japanese Patent Publication No. 09-311231 proposes changing the refractive index profile along the length of the fiber (i.e., axially) by varying the background fluorine concentration.

International Publication No. 2004/027941 proposes changing the refractive index profile along the length of the fiber by application of ultraviolet radiation or by thermal treatment.

Japanese Patent Publication No. 09-048629 discloses an optical fiber that includes a core region in which germanium dopant decreases from a central part to an outer periphery and fluorine dopant decreases from the outer periphery to the central part. The glass viscosity in the fiber cross section is therefore uniformly adjusted to prevent residual stress during fiber drawing.

Japanese Patent Publication No. 09-218319 discloses an optical fiber with reduced Brillouin scattering. The core diameter varies in the longitudinal direction of the optical fiber and includes a first dopant to increase refractive index and to lower the velocity of longitudinal acoustic waves and a second dopant to lower refractive index and to lower the longitudinal acoustic waves.

U.S. Patent Application Publication No. 2002/0118935 A1 proposes an irregular coating surrounding the optical cladding that varies in a lengthwise direction in order to alter the mode profile of the acoustic waves.

"Stimulated Brillouin Scattering Suppression by Means of Applying Strain Distribution to Fiber with Cabling," N. Yoshizawa et al., IEEE JLT, Vol. 11, No. 10, pp. 1518-1522, (1993), proposes wrapping the fiber around a central rod to induce stress to change the energy distribution of acoustic phonons.

Some disadvantages of changing the index of refraction along the axial direction of the fiber, and tight fiber wrapping, include non-uniform fiber properties (e.g., splicing characteristics, Raman gain, and cut-off wavelength) along the fiber length and increased fatigue, which impacts optical fiber life.

U.S. Pat. No. 6,542,683 proposes broadening the energy spectrum of participating SBS phonons by providing a fiber core that includes alternating layers of glass-modifying dopant, which leads to non-uniform thermal expansion and viscosity profiles that impart a residual permanent non-uniform stress in the fiber section. At least two layers of differing coefficients of thermal expansion (CTE) and viscosities generate strain variation in the fiber section. This, in turn, generates Brillouin frequency shift variation, and hence linewidth increase of the mode.

Coefficients of thermal expansion and viscosity control in alternating layers are hard to achieve, and manufacturing processes capable of obtaining a preform of doped and undoped layers within the core requires costly equipment. Moreover, whenever the core is doped, fiber losses increase. This is especially so to the extent dopant concentrations have distinct variations (e.g., step-change variation). Such sharp variations will induce silica network defects at its interfaces, causing increased absorption loss of the fiber and degraded aging behavior.

U.S. Pat. No. 6,587,623 proposes controlling acoustic waves to be guided away from the portion of the waveguide that guides the light (i.e., guiding acoustic waves into the cladding) to reduce photon-phonon interaction and thus reduce SBS. Such an optical fiber is difficult to achieve, however, as the optical fiber refractive index profile must simultaneously satisfy good light guiding and bad acoustic guiding. In trying to reduce SBS in this way, drawbacks in optical transmission properties are expected.

"Effective Stimulated Brillouin Gain in Single Mode Optical Fibers," J. Botineau et al., Electronics Letters, Vol. 31, No. 23, (Nov. 9, 1995), establishes that fibers possessing a trapezoidal refractive index profile achieve a higher Brillouin threshold compared to fibers possessing a step refractive index profile. Trapezoid profile shapes, however, might not be well suited for certain telecommunication applications.

U.S. Publication No. 2004/0218882 A1 discloses an optical fiber having a high SBS threshold. The core includes three regions with a specific doping scheme. The fiber refractive index profile disclosed in this document might not be well suited for certain telecommunication applications.

For compatibility between the optical systems of different manufacturers, the International Telecommunication Union (ITU) has established a standard referenced ITU-T G.652, which must be met by a Standard Single Mode Fiber (SSMF).

This G.652 standard for transmission fibers, recommends inter alia, a range of 8.6 microns to 9.5 microns for the Mode Field Diameter (MFD) at a wavelength of 1310 nanometers; a maximum of 1260 nanometers for the cabled cut-off wavelength; a range of 1300 nanometers to 1324 nanometers for the dispersion cancellation wavelength (denoted $\lambda_0$); and a maximum chromatic dispersion slope of 0.092 ps/(nm$^2$ km) (i.e., ps/nm$^2$/km).

The cabled cut-off wavelength is conventionally measured as the wavelength at which the optical signal is no longer single mode after propagation over 22 meters of fiber, such as defined by subcommittee 86A of the International Electrotechnical Commission under standard IEC 60793-1-44.

Efforts to increase SBS threshold should not result in noncompliance with the G.652 standard.

Moreover, high optical power in transmission optical fibers may damage the fiber coating and thus accelerate aging of the optical fiber wherever bends are present. Reducing bending sensitivity of an optical fiber having a high Brillouin threshold would reduce aging problems of high power applications.

In addition, as previously noted, it is desirable to reduce bending sensitivity of optical fibers for use as termination fibers.

Typical solutions to reduce bending losses are to influence the MAC value. For a given fiber, the so-called MAC value is defined as the ratio of the mode field diameter of the fiber at 1550 nanometers to the effective cut-off wavelength $\lambda_{ceff}$. The effective cut-off wavelength is conventionally measured as the wavelength at which the optical signal is no longer single mode after propagation over two meters of fiber such as defined by sub-committee 86A of the International Electrotechnical Commission under standard IEC 60793-1-44. The MAC value is used to assess fiber performance, particularly to achieve a compromise between mode field diameter, effective cut-off wavelength, and bending losses.

FIG. 1 depicts the experimental results that illustrate bending losses at a wavelength of 1625 nanometers with a bend radius of 15 millimeters in a SSMF fiber in relation to the MAC value at a wavelength of 1550 nanometers. FIG. 1 shows that the MAC value influences fiber bending and that these bending losses may be reduced by lowering the MAC value.

That notwithstanding, a reduction in the MAC value by reducing the mode field diameter and/or by increasing the effective cut-off wavelength may lead to noncompliance with the G.652 standard, making the optical fiber commercially incompatible with some transmission systems.

Compliance with the G.652 standard while reducing bending losses and increasing SBS threshold is a challenge for fiber applications in which single access optical fibers are to be used both in long-haul transmission systems and in Fiber-to-the-Home (FTTH) or Fiber-to-the-Curb (FTTC) systems.

"Bend-Insensitive and Low Splice-Loss Optical Fiber for Indoor Wiring in FTTH," S. Matsuo et al., OFC 2004 Proceedings, Paper Th13 (2004), describes a refractive index profile for single mode fiber (SMF) that permits a reduction in bending losses. This disclosed fiber, however, shows a chromatic dispersion of between 10.2 ps/(nm·km) and 14.1 ps/(nm·km), which lies outside the G.652 standard.

"Low Bending Loss and Low Splice Loss Single Mode Fibers Employing a Trench Profile," S. Matsuo et al., IEICE Trans. Electron., Vol. E88-C, N° 5 (May 2005), describes an optical fiber having a central core, a first inner cladding, and a trench. Some of the exemplary fibers described in this document meet the criteria of the G.652 standard.

Enhanced Bending Loss Insensitive Fiber and New Cables for CWDM Access Networks" I. Sakabe et al., 53$^{rd}$ IWCS Proceedings, pp. 112-118 (2004), proposes reducing the Mode Field Diameter to reduce bending losses. This reduction in mode field diameter, however, leads to overstepping the G.652 standard.

"Development of Premise Optical Wiring Components Using Hole-Assisted Fiber," K. Bandou et al., 53$^{rd}$ IWCS Proceedings, pp. 119-122 (2004), proposes a hole-assisted fiber having the optical characteristics of a SSMF fiber with reduced bending losses. The cost of manufacturing this fiber and its high attenuation levels (>0.25 dB/km) reduce its commercial viability in FTTH systems.

"Ultra-Low Loss and Bend Insensitive Pure-Silica-Core Fiber Complying with G.652 C/D and its Applications to a Loose Tube Cable," T. Yokokawa et al., 53$^{rd}$ IWCS Proceedings, pp. 150-155 (2004), proposes a pure silica core fiber (PSCF) having reduced transmission and bending losses, but with a reduced mode field diameter that falls outside the G.652 standard.

U.S. Pat. No. 6,771,865 describes the refractive index profile of a transmission fiber with reduced bending losses. The optical fiber has a central core, an annular inner cladding, and an optical outer cladding. The annular cladding is doped with germanium and fluorine. U.S. Pat. No. 6,771,865 fails to disclose sufficient information to determine whether its disclosed fiber meets the G.652 standard.

U.S. Pat. No. 4,852,968 describes the profile of a transmission fiber having reduced bending losses. This disclosed fiber, however, has a chromatic dispersion that does not meet the G.652 criteria. The G.652 standard requires cancellation of chromatic dispersion at wavelengths of between 1300 nanometers and 1324 nanometers, but the fiber disclosed in U.S. Pat. No. 4,852,968 shows cancellation of chromatic dispersion at the wavelengths of between 1400 nanometers and 1800 nanometers.

International Application No. 2004/092794 (and its counterpart U.S. Pat. No. 7,164,835) describe the refractive index profile of a transmission fiber with reduced bending losses. The fiber has a central core, a first inner cladding, a second depressed inner cladding, and an outer optical cladding. Some of the exemplary fibers meet the criteria of the G.652 standard. The disclosed fiber is manufactured by Vapor-phase Axial Deposition (VAD) or Chemical Vapor Deposition (CVD). International Application No. 2004/092794 fails to identify the problems of microbending losses and Brillouin scattering.

In view of the foregoing, there is a need for a transmission fiber that meets the criteria of the G.652 standard (i.e., that can be used commercially in FTTH transmission systems of FTTH type) and that shows both reduced bending and microbending losses and increased stimulated Brillouin scattering threshold. Such optical fiber could be used as a single access fiber (i.e., a line fiber for long-haul transmission applications and a feeder fiber or a termination fiber in FTTH applications).

Furthermore, there is a need for an optical fiber having reduced bending losses and increased Brillouin threshold without unfavorably altering its fiber transmission characteristics (e.g., with limited fiber loss increase and without change to the fiber index profile).

SUMMARY OF THE INVENTION

Accordingly, in one aspect the invention embraces an optical fiber that possesses (i) a core having a radius $r_1$ that includes at least two core dopants, wherein the core has a refractive index difference $\Delta n_1$ with an outer optical cladding (e.g., an external optical cladding); (ii) a first inner cladding (i.e., an intermediate cladding) having a radius $r_2$ and a refractive index difference $\Delta n_2$ with the outer cladding; and (iii) a depressed, second inner cladding (i.e., a depressed trench) having a radius $r_3$ and a refractive index difference $\Delta n_3$ with the outer cladding of less than $-3 \times 10^{-3}$; and wherein the radial concentration of at least one of the core dopants varies substantially continuously over the core region.

According to exemplary embodiments, the optical fiber of the present invention may include one or more of the following additional features:

- The radial concentration of at least one of the core dopants varies continuously over the entire core region;
- The radial concentration of each of at least two core dopants varies continuously over the entire core region;
- The radial variation of at least one core dopant concentration is such that its first derivative is proportional to the radial power fraction P(r) of the optical signal transmitted in the optical fiber;
- The optical fiber has, at a wavelength of 1550 nanometers, a spontaneous Brillouin spectrum width greater than or equal to 100 MHz;
- The variation of at least one core dopant concentration corresponds to an refractive index variation greater than or equal to $1 \times 10^{-3}$;
- The core dopants are selected from germanium (Ge), fluorine (F), phosphorus (P), aluminum (Al), chlorine (Cl), boron (B), nitrogen (N), and/or alkali metals;
- One of the core dopants is germanium (Ge), the germanium concentration varying radially in the core between about 1 and 20 weight percent based upon the core's total composition (i.e., mass). In other words, at any position within the core, the germanium concentration ranges between 1 and 20 weight percent (i.e., a radial concentration of about 1-20 weight percent germanium).
- One of the core dopants is fluorine (F), the fluorine concentration varying radially in the core between about 0.3 and 8 weight percent based upon the core's total composition (i.e., mass). In other words, at any position within the core, the fluorine concentration ranges between 0.3 and 8 weight percent (i.e., a radial concentration of about 0.3-8 weight percent fluorine).
- One of the core dopants is phosphorus (P), the phosphorus concentration varying radially in the core between about 1 and 10 weight percent based upon the core's total composition (i.e., mass). In other words, at any position within the core, the phosphorus concentration ranges between 1 and 10 weight percent (i.e., a radial concentration of about 1-10 weight percent phosphorus).
- The depressed, second inner cladding includes germanium in a radial concentration of between 0.5 weight percent and 7 weight percent based upon the second inner cladding's total composition (i.e., mass). Stated differently, at any position within the second inner cladding, the germanium concentration is between about 0.5 and 7 weight percent.
- The refractive index difference $\Delta n_3$ between the second inner cladding and the outer cladding is greater than about $-15 \times 10^{-3}$;
- The optical fiber has, at a wavelength of 1550 nanometers, an effective area greater than or equal to 50 $\mu m^2$;
- The optical fiber has, at a wavelength of 1550 nanometers, an attenuation less than or equal to 0.3 dB/km;
- The optical fiber has, at a wavelength of 1625 nanometers, bending losses that are less than about 0.1 dB for a winding of ten turns around a bend radius of 15 millimeters; less than about 0.2 dB for a winding of one turn around a bend radius of 10 millimeters; and less than about 0.5 dB for a winding of one turn around a bend radius of 7.5 millimeters;
- The optical fiber has, at a wavelength of 1550 nanometers, bending losses that are less than about 0.02 dB for a winding of ten turns around a bend radius of 15 millimeters; less than about 0.05 dB for a winding of one turn around a bend radius of 10 millimeters; and less than about 0.2 dB for a winding of one turn around a bend radius of 7.5 millimeters;
- The optical fiber has, up to a wavelength of 1625 nanometers, microbending losses, measured by the so-called fixed diameter drum method, of 0.8 dB/km or less.

In another aspect, the invention embraces an optical module or a storage box that includes a housing receiving at least a wound portion of the optical fiber according to the invention. According to exemplary embodiment, the optical fiber is wound with a bending radius of less than about 15 millimeters (e.g., 10 millimeters or less) in the optical module or the storage box according to the present invention.

In a related aspect, the invention embraces an optical system (e.g., FTTH or FTTC) that includes at least one optical module or one storage box according to the invention.

The foregoing, as well as other characteristics and advantages of the present invention, and the manner in which the same are accomplished, are further specified within the following detailed description and its accompanying drawings.

BRIEF DESCRIPTION OF THE DRAWING

FIG. 4b depicts germanium dopant concentration in the exemplary optical fiber of FIG. 4a.

FIG. 4c depicts fluorine dopant concentration in the exemplary optical fiber of FIG. 4a.

DETAILED DESCRIPTION

Figure 1:
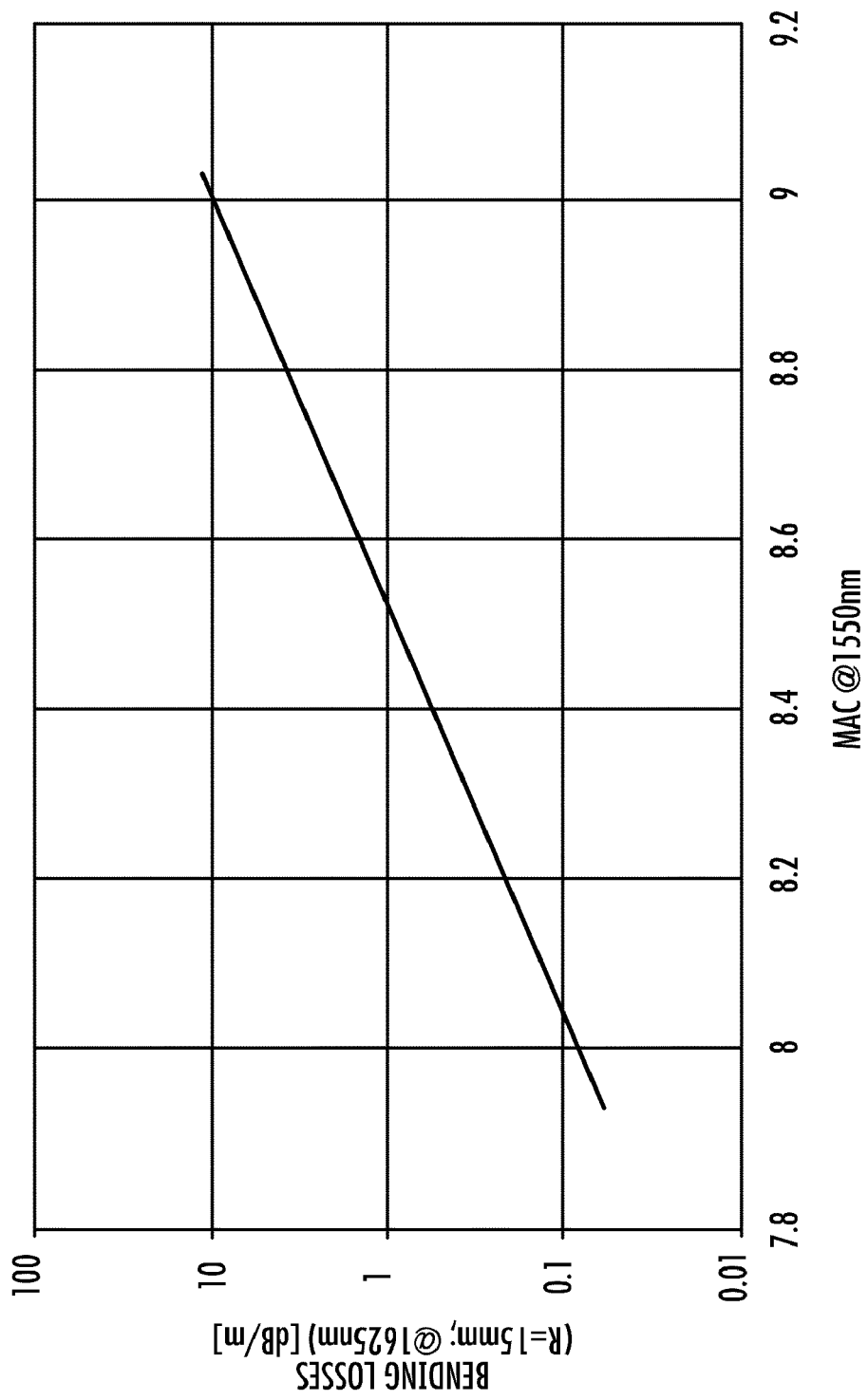
FIG. 1 (previously described) depicts bending losses at a wavelength of 1625 nanometers with a bend radius of 15 millimeters in a standard single-mode fiber (SSMF) in relation to the MAC value at a wavelength of 1550 nanometers.

In one aspect (and with reference to FIG. 2), the present invention embraces an optical fiber 10 that includes a core 11 (i.e., the central core region in which the optical signal to be transmitted is guided) and a cladding region for confining the optical signal in the core 11. The cladding region includes a first inner cladding 12, a depressed trench 13 (or depressed, second inner cladding), and an outer cladding 14 (e.g., an external optical cladding). The depressed trench 13 typically has a refractive index difference with the outer cladding 14 that is less than $-3 \times 10^{-3}$ (e.g., less than about $-15 \times 10^{-3}$).

According to the present invention, the core region of the optical fiber includes at least two dopants, the concentrations of which, in effect, vary continuously over the entire radius of the core region. Typically, the substantially continuous variation in radial dopant concentration is progressive (e.g., increasing continuously in a radial direction) or regressive (e.g., decreasing continuously in a radial direction). That said, it is within the scope of the invention for the radial dopant concentration to both increase and decrease in a radial direction.

According to the present invention, the variation of the first dopant (e.g., germanium) is compensated by variation of the second dopant (e.g., fluorine) to obtain a predetermined refractive index profile of the core region. The core region remains longitudinally homogeneous along the optical fiber (i.e., concentrations of the core dopants are constant along the optical fiber's length).

As will be appreciated by those having ordinary skill in the art, depending on the application, the optical fiber has a target refractive index profile that is defined according to various parameters (i.e., mode field diameter, chromatic dispersion parameters, effective cut-off wavelength, and effective area).

Variation of dopant concentration in the optical fiber's radial direction, particularly in its core, broadens the Brillouin spectrum and thereby increases the Brillouin threshold. A smooth dopant variation ensures uniform mode power distribution for the different dopant concentrations and limits fiber losses. Use of at least two dopants in the optical fiber facilitates the achievement of a target refractive index profile and reduces the impact of SBS reduction on other optical parameters, particularly mode field diameter and chromatic dispersion parameters. The optical fiber according to the present invention possesses a refractive index profile that meets the aforementioned G.652 standard.

Figure 2:
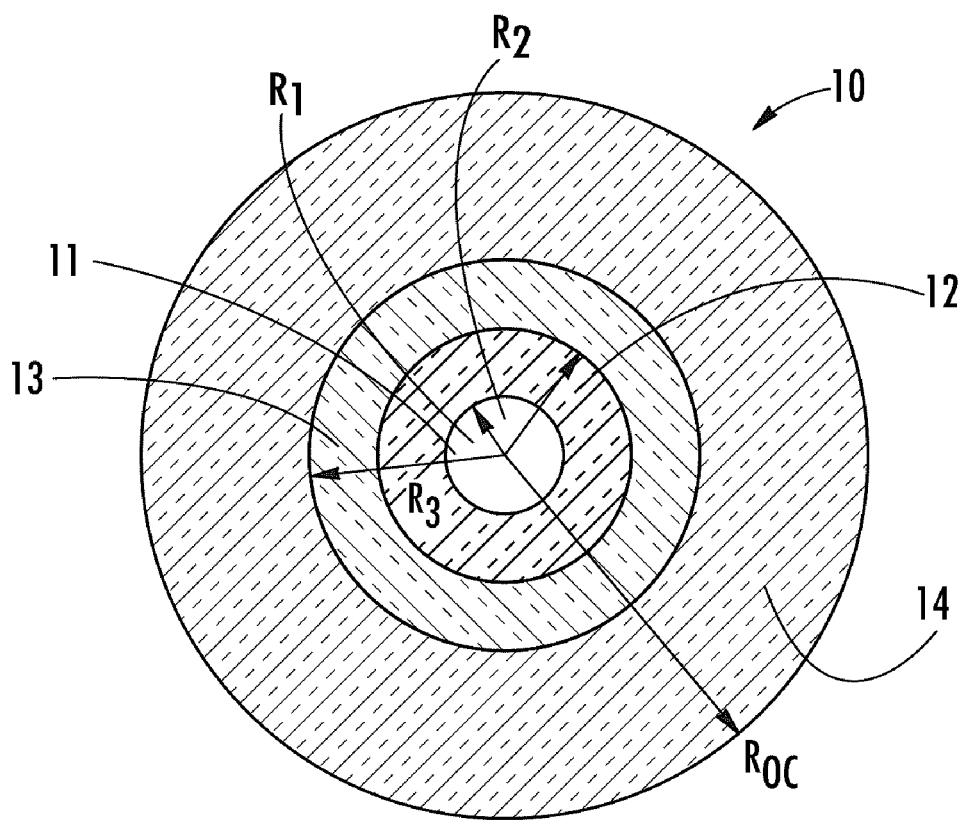
FIG. 2 schematically depicts a cross-section (not to scale) of an exemplary optical fiber according to the present invention.
Figure 3:
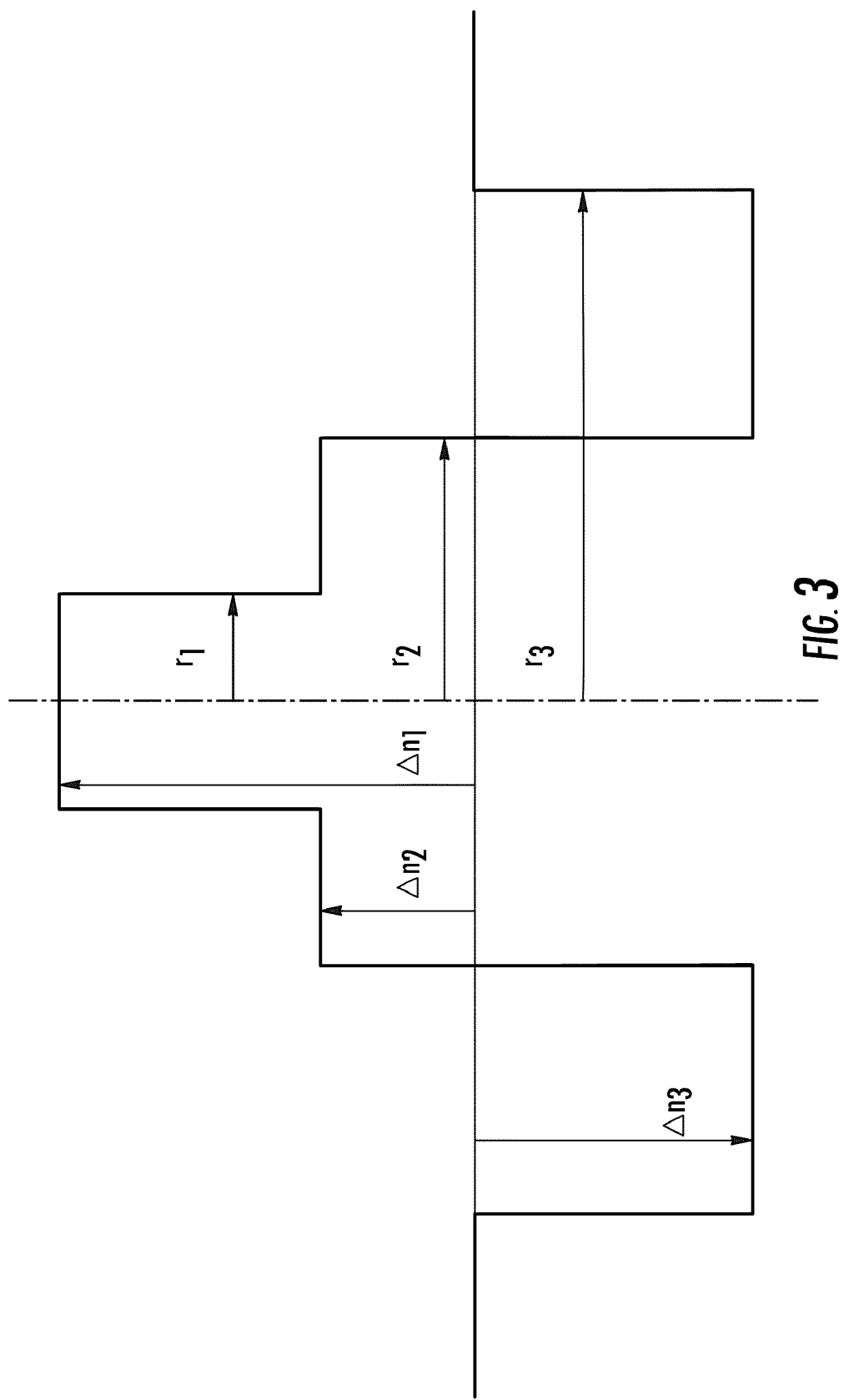
FIG. 3 depicts the nominal refractive index profile of an exemplary single-mode fiber according to the present invention.

FIG. 3 depicts a nominal refractive index profile of a single-mode transmission optical fiber according to the present invention. As schematically depicted in FIG. 2, the exemplary optical fiber 10 includes (i) a central core 11 having refractive index difference $\Delta n_1$ with an outer cladding 14; (ii) a first inner cladding 12 (i.e., an intermediate cladding) having a refractive index difference $\Delta n_2$ with the outer cladding 14; and (iii) a depressed trench 13 having an a refractive index difference $\Delta n_3$ with the outer cladding 14. The width of the core 11 is defined by its radius $r_1$ and the widths of the claddings by their respective outer radii $r_2$ and $r_3$.

To define a nominal refractive index profile for an optical fiber, the index of the outer cladding is generally taken as a reference. The index values of the central core and of the claddings are then provided as index differences (i.e., $\Delta n_{1,2,3}$) with the outer cladding. Generally, the outer cladding is formed of silica, but may be doped to increase or reduce its refractive index, such as to modify the signal propagation characteristics.

Each section of the refractive index profile of the optical fiber can therefore be defined using integrals that associate the variations in refractive indexes with the radius of each fiber section. See FIG. 2.

Three integrals thus can be defined for the optical fiber, which represent the core surface $I_1$ the surface of the first inner cladding $I_2$ and the surface of the depressed, second inner cladding $I_3$. In this regard, the expression "surface" is not to be interpreted geometrically (i.e., structurally) but should be understood instead to describe the area under the curve (i.e., $r \cdot \Delta n$) such as depicted in FIG. 3.

These three integrals can be expressed as follows:

$$I_1 = \int_0^{r_1} \Delta n(r) \cdot dr \approx r_1 \times \Delta n_1$$

$$I_2 = \int_{r_1}^{r_2} \Delta n(r) \cdot dr \approx (r_2 - r_1) \times \Delta n_2$$

$$I_3 = \int_{r_2}^{r_3} \Delta n(r) \cdot dr \approx (r_3 - r_2) \times \Delta n_3$$

Table 1 (below) gives the limit values of radii and refractive index differences, and the limit values of the integral $I_1$ that are required so that the optical fiber shows reduced bending losses and microbending losses while meeting the optical propagation criteria of standard G.652 for transmission fibers. The values provided in the table are the nominal profiles of optical fibers according to the present invention.

TABLE 1

|  | $r_1$ (μm) | $r_2$ (μm) | $r_3$ (μm) | $r_1/r_2$ | $\Delta n_1$ ($10^{-3}$) | $\Delta n_2$ ($10^{-3}$) | $\Delta n_3$ ($10^{-3}$) | $\Delta n_1 - \Delta n_2$ ($10^{-3}$) | $I_1$ (μm · $10^{-3}$) |
|---|---|---|---|---|---|---|---|---|---|
| Min | 3.5 | 7.5 | 12.0 | 0.27 | 4.2 | −1.2 | −15 | 3.9 | 17 |
| Max | 4.5 | 14.5 | 25.0 | 0.5 | 6.2 | 1.2 | −3 | 5.9 | 24 |

The integral $I_1$ of the central core influences the shape and size of the fundamental propagation mode of the signal in the optical fiber. An integral value for the central core of between $17 \times 10^{-3}$ microns and $24 \times 10^{-3}$ microns makes it possible in particular to maintain a mode field diameter that is compatible with the G.652 standard. In addition, the depressed trench $\Delta n_3$ makes it possible to improve bending losses and microbending losses in SSMF.

According to the invention, the core region of the optical fiber includes at least two dopants whose respective concentrations vary substantially continuously over essentially the entire core region while maintaining the core region's pre-determined refractive index profile. Those having ordinary skill in the art will appreciate that radial dopant concentration might be unchanged over small increments (i.e., radial segments) without departing from the scope of the invention. That said, as a practical matter, radial dopant concentration typically varies continuously over the core radius. See FIGS. 4b-4c.

As noted, this allows broadening the Brillouin spectrum and thereby increases the Brillouin threshold. Because the dopant concentration variation is compensated so as to keep a pre-determined refractive index profile, notably in the core region, the optical propagation criteria of the G.652 standard are not jeopardized by the presence of at least two dopants in the core. Moreover, the first inner cladding ($\Delta n_2$, $r_2$) ensures that the optical power remains in the core region without the depressed trench ($\Delta n_3$, $r_3$) adversely impacting optical power throughput.

For a signal propagating at a wavelength of 1550 nanometers, the optical fiber of the invention has a spontaneous Brillouin spectrum width that is at least about 100 MHz. Such a broadened Brillouin spectrum effectively increases the Brillouin threshold by at least a factor of two (or by about three dB in logarithmic scale) as compared to a standard single mode fiber (SSMF). The optical fiber of the invention achieves a much higher Brillouin threshold compared to standard transmission fibers with limited fiber loss (e.g., less than 0.3 dB/km at a wavelength of 1550 nanometers) without significant change to the optical transmission parameters.

The first core dopant (e.g., germanium) is chosen to achieve strong and continuous variations in density and elasticity in the fiber material. According to one embodiment, the radial distribution of the first dopant concentration $C_d(r)$ is such that its first derivative is proportional to the radial power fraction $P(r)$ of the optical signal transmitted in the fiber in accordance with the following equation (in which $\alpha$ is a constant):

$$\frac{dC_d(r)}{dr} = \alpha \cdot P(r)$$

This radial power fraction $P(r)$ is expressed in watt per meters, the integral of which is equal to the total transmitted power P according to the following relationship:

$$\int P(r)dr = P$$

According to another embodiment, the depressed trench (i.e., the second inner cladding) can include germanium at a concentration of between about 0.5 and 7 weight percent, typically in a concentration of less than about 1.5 weight percent (e.g., between about 0.5 and 1.5 weight percent), even if the index needs to be less than $-3 \times 10^{-3}$. The presence of germanium in the depressed trench modifies the viscosity of silica and the depressed trench's elasto-optical coefficient, thereby improving microbending sensitivity.

Figure 4A:
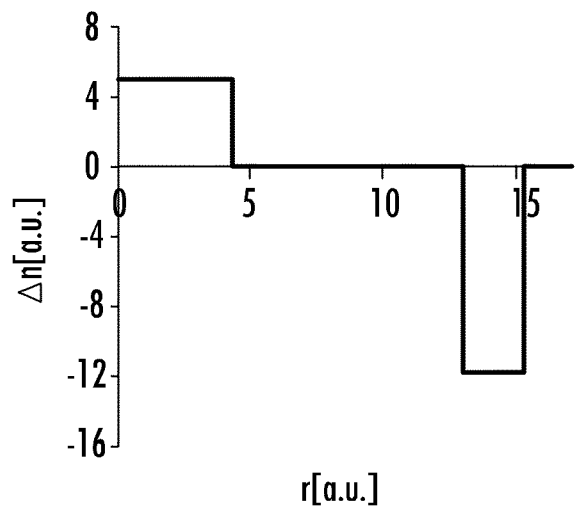
FIG. 4a depicts a reference refractive index profile of an exemplary optical fiber according to the present invention.
Figure 4B:
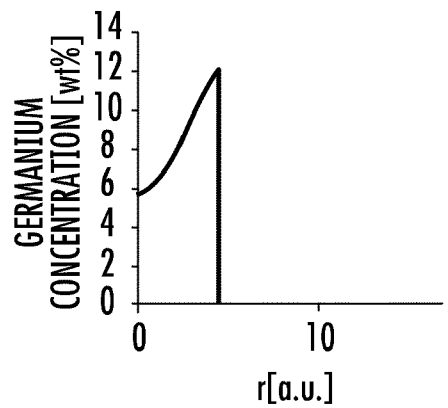
Figure 4C:
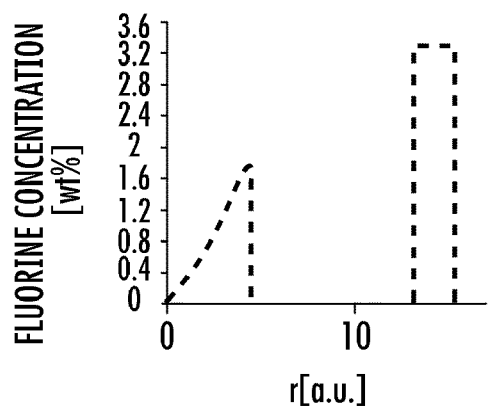

FIGS. 4a, 4b, and 4c relate to an exemplary optical fiber according to the present invention. The optical fiber of FIGS. 4a-4c possesses a step-core profile. The core has a given constant refractive index value; the depressed trench is separated from the core by an intermediate inner cladding (i.e., the first inner cladding). FIG. 4a illustrates the exemplary optical fiber's refractive index profile using arbitrary units.

Turning to FIG. 4b and FIG. 4c, the core region of the fiber includes a first dopant, germanium (Ge), which is known to increase the value of the refractive index of silica, and a second dopant, fluorine (F), which is known to decrease the value of the refractive index of silica. FIG. 4b and FIG. 4c illustrate dopant concentrations in weight percent. According to the invention, the concentration of at least one of the core dopants varies essentially continuously over the entire core region.

With respect to the exemplary optical fiber depicted in FIGS. 4a, 4b, and 4c, both dopants vary continuously (and progressively) over the entire core region. The use of at least two dopants ensures that the core refractive index profile is maintained to a nominal profile such to achieve desirable optical transmission characteristics. Indeed, because the second dopant can compensate for the refractive index variation introduced by the variation of concentration of the first dopant, a target refractive index profile can be achieved.

The variation of at least one core dopant concentration introduces density and elasticity variation in the optical fiber section that broadens the Brillouin spectrum and thereby increases the Brillouin threshold. The variation of core dopant concentration should be large enough to introduce sufficient density and elasticity variation in order to reduce SBS.

The inventors have achieved satisfactory results if at least one of the core dopants has a concentration variation over the entire core region that corresponds to a refractive index variation that is at least about $1 \times 10^{-3}$ (i.e., variation in core dopant concentration sufficient to achieve this refractive index variation if not compensated by another core dopant). In other words, the variation in first dopant concentration (i.e., between the maximum and minimum radial dopant concentrations) should be such that, without compensation by a second dopant, a refractive index variation of at least about $1 \times 10^{-3}$ would be achieved in the core.

As schematically depicted in FIGS. 4b-4c, the germanium concentration varies progressively from 5.8 weight percent to 12 weight percent, and the fluorine concentration varies progressively from 0.1 weight percent to 1.7 weight percent.

The smooth and regular variation of dopant concentration ensures uniform mode power distribution for the different dopant concentration and limits fiber losses. Simulations performed on an optical fiber exemplified in FIGS. 4a, 4b, and 4c gives, at a signal wavelength of 1550 nanometers, a spontaneous Brillouin spectrum width larger than 100 MHz and an increased SBS threshold power (i.e., increased by at least a factor of two compared as compared to a standard single mode fiber), and a limited Rayleigh loss increase of about 0.013 dB/km. Despite this Rayleigh loss increase, the optical fiber of the present invention maintains compliance with the G.652 standard, having attenuation losses of less than about 0.3 dB/km at 1550 nanometers.

As noted, FIGS. 4a, 4b, and 4c represent one example of the present invention. Dopants other than germanium (Ge) and fluorine (F) can be used to achieve an optical fiber with reduced SBS according to the present invention. In this regard, the core region includes at least two dopants that may be selected from germanium (Ge), fluorine (F), phosphorus (P), aluminum (Al), chlorine (Cl), boron (B), nitrogen (N), and/or alkali metals. To the extent one of the core dopants is germanium (Ge), the concentration typically falls between about one and 20 weight percent; to the extent one of the core dopants is fluorine (F), the concentration is typically less than ten weight percent (e.g., between about 0.3 and eight weight percent); to the extent one of the core dopants is phosphorus (P) the concentration typically falls between about one and ten weight percent.

The exemplary optical fiber represented in FIGS. 4a-4c possesses a depressed trench to reduce its sensitivity to bending losses. The optical fiber of the invention therefore combines low bending losses and high Brillouin threshold.

Conventionally, starting from the teaching of J. Botineau et al. in "Effective Stimulated Brillouin Gain in Single Mode Optical Fibers," Electronics Letters, Vol. 31, No. 23 (1995), one having ordinary skill in the art would choose a refractive index profile with triangular shape or parabolic shape to increase the Brillouin threshold and might apply an external trench to reduce bending losses. This conventional approach, however, renders compliance with the G.652 specifications difficult.

Figure 5:
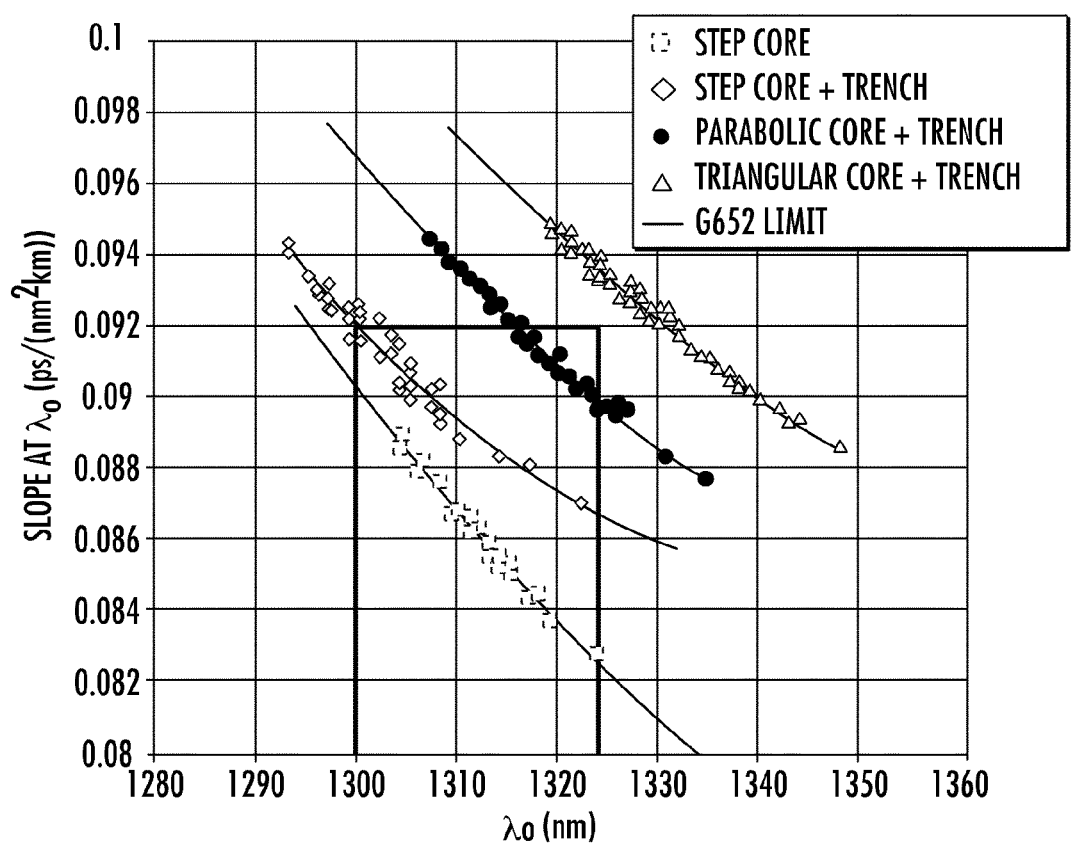
FIG. 5 depicts dispersion characteristics for four different kinds of optical fibers.

FIG. 5 compares four different kinds of refractive index profile shapes: a typical step refractive index profile without trench (i.e., SSMF); a step-core refractive index profile with a trench in the cladding (e.g., the optical fiber of FIGS. 4a-4c); a triangular core refractive index profile with a trench in the cladding; and a parabolic core profile with a trench in the cladding. For each, numerous refractive index profiles with different core diameter and maximum dopant level were simulated.

FIG. 5 depicts the zero dispersion wavelength $\lambda_0$ and the slope of the dispersion at the zero dispersion wavelength. The rectangle area indicates the parameters of the G.652 specifications for those optical characteristics. Fiber profiles having too high cut-off wavelengths and non-conforming nominal mode-field diameter at 1310 nanometers so as to be non-compliant with the G.652 specifications were omitted.

FIG. 5 shows that adding a depressed trench to a SSMF profile restricts the profile flexibility for production and thus increases fiber rejection rate. Using a triangular core refractive index profile with a trench in the cladding results in optical fibers that do not meet the G.652 requirements. A parabolic core refractive index profile with a trench in the cladding does yields some optical fibers within the G.652 specifications, but the zone of tolerance is narrow and many rejects would be expected.

The optical fiber of the invention achieves reduced bending and microbending losses, as well as a much higher Brillouin threshold, compared to standard transmission optical fibers. The optical fiber of the invention may be used in a receiver module of a FTTH system or in a transmitter module to input high power signals into a telecommunication system, or in a high bit-rate long-haul optical transmission cable, with reduced optical losses. Moreover, the optical fiber according to the present invention is compatible with marketed systems as it meets standard G.652.

In one embodiment, the optical fiber of the present invention exhibits, at a wavelength of 1310 nanometers, a chromatic dispersion slope of 0.092 ps/(nm$^2$·km) or less; a cancellation of chromatic dispersion at a wavelength of between 1300 and 1324 nanometers; and a cabled cut-off wavelength of 1260 nanometers or less.

In another embodiment, the optical fiber of the present invention has, at a wavelength of 1550 nanometers, an effective area superior or equal to 50 µm$^2$, typically 80 µm$^2$, and attenuation at 1550 nanometers of less than or equal to 0.3 dB/km. Such optical fiber according to this embodiment is suitable for use in data transmission in telecommunication systems.

In this regard, an exemplary optical transmission system may include an optical transmitter emitting optical signals in a predetermined range of wavelength, a transmission optical fiber according to the present invention, and an optical receiver receiving the optical signal with improved signal-to-noise ratio (SNR) due to reduced SBS and limited increase in fiber losses (e.g., attenuation). As compared to conventional systems, the optical transmitter may input into the optical fiber an optical signal with higher power, the Brillouin threshold power for the transmission optical fiber being increased by at least a factor of two compared with a conventional SMF.

In yet another embodiment, the optical fiber of the present invention has, at a wavelength of 1625 nanometers, improved bending losses as follows: less than about 0.1 dB for a winding of ten turns around a bend radius of 15 millimeters; less than about 0.2 dB for a winding of one turn around a bend radius of ten millimeters; and less than about 0.5 dB for a winding of one turn around a bend radius of 7.5 millimeters.

Likewise, the optical fiber of the present invention has, at a wavelength of 1550 nanometers, improved bending losses as follows: less than about 0.02 dB for a winding of ten turns around a bend radius of 15 millimeters; less than about 0.05 dB for a winding of one turn around a bend radius of ten millimeters; and less than about 0.2 dB for a winding of one turn around a bend radius of 7.5 millimeters.

Moreover, for wavelengths of up to 1625 nanometers, the optical fiber of the present invention demonstrates microbending losses of less than about 0.8 dB/km measured by the so-called fixed diameter drum method. Accordingly, such optical fiber is suitable for implementation in optical modules or storage boxes for use in FTTH or FTTC systems. Commonly assigned U.S. Patent Application Publication No. 2007/0258686 A1 (and its corresponding U.S. application Ser. No. 11/743,365), each of which is hereby incorporated by reference in its entirety, disclose that the fixed drum method is described in the technical recommendations by Subcommittee 86A of the International Electrotechnical Commission under reference IEC TR-62221.

In the specification and figures, typical embodiments of the invention have been disclosed. The present invention is not limited to such exemplary embodiments. Unless otherwise noted, specific terms have been used in a generic and descriptive sense and not for purposes of limitation.

The invention claimed is:

1. An optical fiber, comprising:
a core surrounded by an outer cladding, said core (i) including at least two core dopants, wherein the radial concentration of at least one of said core dopants varies continuously over said core, and (ii) having a radius $r_1$ and a refractive index difference $\Delta n_1$ with said outer cladding;
a first inner cladding positioned between said core and said outer cladding, said first inner cladding having a radius $r_2$ and a refractive index difference $\Delta n_2$ with said outer cladding, wherein the maximum refractive index difference between said core and said first inner cladding ($\Delta n_1 - \Delta n_2$) is between about $3.0 \times 10^{-3}$ and $7.4 \times 10^{-3}$; and
a depressed, second inner cladding positioned between said first inner cladding and said outer cladding, said second inner cladding having a radius $r_3$ and a refractive index difference $\Delta n_3$ with said outer cladding of less than $-3 \times 10^{-3}$.

2. An optical fiber according to claim 1, wherein the refractive index difference between said core and said outer cladding is between about $4.2 \times 10^{-3}$ and $6.2 \times 10^{-3}$.

3. An optical fiber according to claim 1, wherein the refractive index difference $\Delta n_2$ between said first inner cladding and said outer cladding is between about $-1.2\times10^{-3}$ and $1.2\times10^{-3}$.

4. An optical fiber according to claim 1, wherein the radial concentration of each of said at least two core dopants varies continuously over said core.

5. An optical fiber according to claim 1, wherein the radial variation of at least one core dopant concentration is such that its first derivative is proportional to the radial power fraction P(r) of an optical signal transmitted in the optical fiber.

6. An optical fiber according to claim 1, wherein the optical fiber has, at a wavelength of 1550 nanometers, a spontaneous Brillouin spectrum width of at least about 100 MHz.

7. An optical fiber according to claim 1, wherein the variation of at least one core dopant concentration corresponds to a refractive index variation greater than about $1\times10^{-3}$.

8. An optical fiber according to claim 1, wherein said at least two core dopants include one or more of germanium (Ge), fluorine (F), phosphorus (P), aluminum (Al), chlorine (Cl), boron (B), nitrogen (N), and/or alkali metals.

9. An optical fiber according to claim 1, wherein one of said core dopants comprises germanium (Ge), the germanium concentration within said core varying radially between about 1 and 20 weight percent.

10. An optical fiber according to claim 1, wherein one of said core dopants comprises fluorine (F), the fluorine concentration within said core varying radially between about 0.3 and 8 weight percent.

11. An optical fiber according to claim 1, wherein one of said core dopants comprises phosphorus (P), the phosphorus concentration within said core varying radially between about 1 and 10 weight percent.

12. An optical fiber according to claim 1, wherein said second inner cladding comprises germanium in a concentration between about 0.5 and 7 weight percent.

13. An optical fiber according to claim 1, wherein the index difference $\Delta n_3$ between said second inner cladding and said outer cladding is between $-15\times10^{-3}$ and $-3\times10^{-3}$.

14. An optical fiber according to claim 1, the optical fiber having, at a wavelength of 1550 nanometers, an effective area greater than about 50 $\mu m^2$.

15. An optical fiber according to claim 1, the optical fiber having, at a wavelength of 1550 nanometers, attenuation less than about 0.3 dB/km.

16. An optical fiber according to claim 1, the optical fiber having, at a wavelength of 1625 nanometers, bending losses that are less than about 0.1 dB/m for a winding of ten turns around a bend radius of 15 millimeters.

17. An optical fiber according to claim 1, the optical fiber having, at a wavelength of 1625 nanometers, bending losses that are less than about 0.2 dB/m for a winding of one turn around a bend radius of 10 millimeters.

18. An optical fiber according to claim 1, the optical fiber having, at a wavelength of 1625 nanometers, bending losses that are less than about 0.5 dB/m for a winding of one turn around a bend radius of 7.5 millimeters.

19. An optical fiber according to claim 1, the optical fiber having, at a wavelength of 1550 nanometers, bending losses that are less than about 0.02 dB/m for a winding of ten turns around a bend radius of 15 millimeters.

20. An optical fiber according to claim 1, the optical fiber having, at a wavelength of 1550 nanometers, bending losses that are less than about 0.05 dB/m for a winding of one turn around a bend radius of 10 millimeters.

21. An optical fiber according to claim 1, the optical fiber having, at a wavelength of 1550 nanometers, bending losses that are less than about 0.2 dB/m for a winding of one turn around a bend radius of 7.5 millimeters.

22. An optical fiber according to claim 1, the optical fiber having, at a wavelength of up to 1625 nanometers, microbending losses of about 0.8 dB/km or less as measured by the fixed diameter drum method.

23. The optical fiber according to claim 1, wherein the optical fiber possesses:
 a cancellation of chromatic dispersion at a wavelength of between about 1300 and 1324 nanometers;
 a chromatic dispersion slope of about 0.092 ps/(nm²·km) or less at a wavelength of 1310 nanometers; and
 a cabled cut-off wavelength of about 1260 nm or less.

24. An optical fiber according to claim 1, wherein $r_1/r_2$, the ratio of the radius of said core to the radius of said first inner cladding, is between about 0.27 and 0.5.

25. An optical fiber according to claim 1, wherein the value of the following integral of the central core ($I_1$) is between about $17\times10^{-3}$ micron and $24\times10^{-3}$ micron:

$$I_1 = \int_0^{r1} \Delta n(r)\cdot dr \approx r_1 \times \Delta n_1.$$

26. A storage box or an optical module comprising a housing, said storage box or said optical module receiving the optical fiber according to claim 1, wherein at least a portion of the optical fiber is wound with a bending radius of less than 15 millimeters.

27. A Fiber-to-the-Home (FTTH) optical system or a Fiber-to-the-Curb (FTTC) optical system comprising at least one optical module or one storage box according to claim 26.

28. An optical fiber, comprising:
 a central core surrounded by an outer optical cladding, said central core (i) including at least two core dopants, wherein the radial concentration of at least one of said core dopants varies substantially continuously over said central core, and (ii) having a positive refractive index difference $\Delta n_1$ with said outer optical cladding, wherein the maximum refractive index difference $\Delta n_1$ is between about $4.2\times10^{-3}$ and $6.2\times10^{-3}$;
 a first inner cladding immediately surrounding said central core, said first inner cladding having a refractive index difference $\Delta n_2$ with said outer optical cladding, wherein the refractive index difference between said central core and said first inner cladding ($\Delta n_1 - \Delta n_2$) is positive; and
 a depressed, second inner cladding positioned between said first inner cladding and said outer optical cladding, said second inner cladding having a refractive index difference $\Delta n_3$ with said outer optical cladding of less than about $-3\times10^{-3}$.

29. An optical fiber according to claim 28, wherein the refractive index difference between said central core and said first inner cladding ($\Delta n_1 - \Delta n_2$) is between about $3.0\times10^{-3}$ and $7.4\times10^{-3}$.

30. An optical fiber according to claim 28, wherein the refractive index difference between said central core and said first inner cladding ($\Delta n_1 - \Delta n_2$) is between about $3.9\times10^{-3}$ and $5.9\times10^{-3}$.

31. An optical fiber according to claim 28, wherein the refractive index difference $\Delta n_2$ between said first inner cladding and said outer cladding is between about $-1.2\times10^{-3}$ and $1.2\times10^{-3}$.

32. An optical fiber according to claim 28, wherein the index difference $\Delta n_3$ between said second inner cladding and said outer cladding is greater than $-15\times10^{-3}$.

33. An optical fiber according to claim 28, wherein said central core has a radius ($r_1$) between about 3.5 microns and 4.5 microns.

34. An optical fiber according to claim 28, wherein said first inner cladding has a radius ($r_2$) between about 7.5 microns and 14.5 microns.

35. An optical fiber according to claim 28, wherein said second inner cladding has a radius ($r_3$) between about 12 microns and 25 microns.

36. An optical fiber according to claim 28, wherein the radial concentration of each of said at least two core dopants varies substantially continuously over said central core.

37. An optical fiber according to claim 28, wherein said at least two core dopants include one or more of germanium (Ge), fluorine (F), phosphorus (P), aluminum (Al), chlorine (Cl), boron (B), nitrogen (N), and/or alkali metals.

38. An optical fiber according to claim 28, wherein a first said core dopant comprises germanium (Ge), the germanium concentration within said central core varying radially between about 1 and 20 weight percent, and a second said core dopant comprises fluorine (F), the fluorine concentration within said central core varying radially between about 0.1 and 10 weight percent.

39. An optical fiber according to claim 28, wherein said second inner cladding is doped with germanium.

40. An optical fiber according to claim 28, wherein the optical fiber has, at a wavelength of 1550 nanometers, a spontaneous Brillouin spectrum width of at least about 100 MHz.

41. An optical fiber according to claim 28, wherein the value of the following integral of the central core ($I_1$) is between about $17 \times 10^{-3}$ micron and $24 \times 10^{-3}$ micron:

$$I_1 = \int_0^{r_1} \Delta n(r) \cdot dr \approx r_1 \times \Delta n_1.$$

42. The optical fiber according to claim 28, wherein the optical fiber possesses:
- a cancellation of chromatic dispersion at a wavelength of between about 1300 and 1324 nanometers;
- a chromatic dispersion slope of about 0.092 ps/(nm²·km) or less at a wavelength of 1310 nanometers; and
- a cabled cut-off wavelength of about 1260 nm or less.

43. An optical fiber according to claim 28, the optical fiber having, at a wavelength of 1625 nanometers, bending losses that (i) are less than about 0.1 dB/m for a winding of ten turns around a bend radius of 15 millimeters, (ii) are less than about 0.2 dB/m for a winding of one turn around a bend radius of 10 millimeters, and/or (iii) are less than about 0.5 dB/m for a winding of one turn around a bend radius of 7.5 millimeters.

44. An optical fiber according to claim 28, the optical fiber having, at a wavelength of 1550 nanometers, bending losses that (i) are less than about 0.02 dB/m for a winding of ten turns around a bend radius of 15 millimeters, (ii) less than about 0.05 dB/m for a winding of one turn around a bend radius of 10 millimeters, and/or (iii) are less than about 0.2 dB/m for a winding of one turn around a bend radius of 7.5 millimeters.

45. A cable containing one or more fibers according to claim 28.

46. An optical box receiving at least a portion of the fiber according to claim 28.

47. A Fiber-To-The-Home (FTTH) or a Fiber-To-The-Curb (FTTC) system comprising at least a portion of the fiber according to claim 28.

* * * * *